June 15, 1965 R. E. PANZER 3,189,485
ELECTROCHEMICAL POWER PRODUCING BATTERY CELL
Filed Jan. 25, 1962
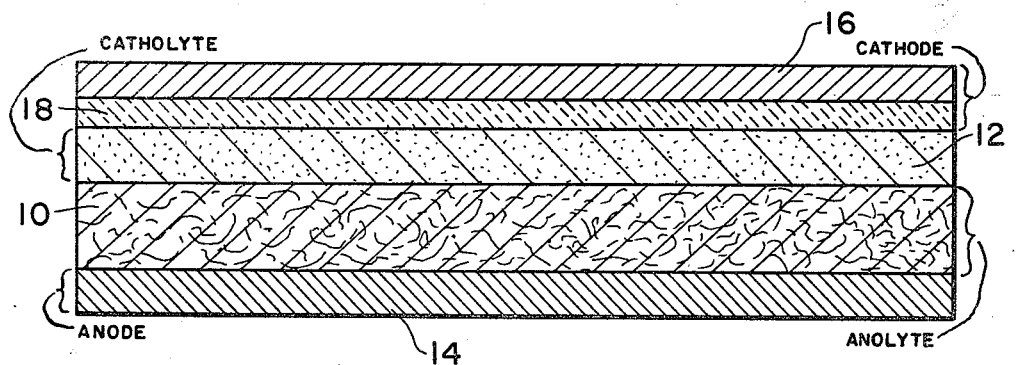
RICHARD E. PANZER
INVENTOR.
BY *J. M. St. Amand*
ATTORNEY

United States Patent Office 3,189,485
Patented June 15, 1965

3,189,485
ELECTROCHEMICAL POWER PRODUCING
BATTERY CELL
Richard E. Panzer, Arlington, Calif., assignor to the
United States of America as represented by the Secretary of the Navy
Filed Jan. 25, 1962, Ser. No. 168,850
2 Claims. (Cl. 136—93)
(Granted under Title 35, U.S. Code (1952), sec. 266)

The invention herein described may be manufactured and used by or for the Government of the United States of America for governmental purposes without the payment of any royalties thereon or therefor.

The present invention relates to battery electrodes and more particularly to the utilization of uranium and its compounds as electrode components of electrochemical power supplies.

Many active metals have been used as anode electrodes in batteries. These were usually light, highly active metals such as the alkali and alakline earth metals or zinc, aluminum and lead. Few heavy elements with multiple oxidation states have been considered as anodes because only rarely do they exhibit potentials great enough to justify their use.

Numerous metallic oxides have been used as cathode electrodes. These have loosely been called "depolarizers." With few exceptions these oxides are those of the transition metals such as manganese, iron, chromium, vanadium, copper, etc. These oxides offer varying advantages depending on the environment and operating conditions within the cell. While most of these oxides have been considered for use in thermal cells having a fused electrolyte, only a few, notably vanadium oxides, chromates and iron oxides have proved to be of value.

Many of the oxides that have been used in thermal cells have disadvantages in that they provide low electrochemical efficiency due to reaction with the electrolyte, excessive concentration polarization from reaction products, and other polarization phenomena associated with high power cells. Long life high power cells have not been heretofore attained. The present invention using uranium metal and uranium oxides in a cell offer considerable advantages over some of the materials previously used by the elimination of side reactions which reduce the electrochemical efficiency of the cell.

It is an object of the invention therefore to provide a novel electrochemical cell using uranium metal as an anode and uranium oxides or other oxides of intermediate composition as the cathode.

It is another object of the invention to provide a novel long life high power electrochemical cell.

A further object of the invention is to provide a uranium oxide glass cathode in an electrochemical cell using uranium metal or other active metal as the anode.

Other objects and many of the attendant advantages of this invention will become readily appreciated as the same becomes better understood by reference to the following detailed description when considered in connection with the accompanying drawing wherein:

The figure of drawing shows a cell assembly as one embodiment of the invention.

In the present invention uranium metal and uranium oxides are used in electrochemical power supplies to produce voltages and relatively high current densities. While it has been shown previously, in the article "Electromotive Force of Cells with Uranium-Uranium Halide Couples in Fused-Salt Electrolytes" by E. D. Eastman, J. A. Campbell, D. D. Cubiciotti and M. J. Sienko in "Chemistry of Uranium—Collected Papers," Edited by Joseph Katz; USAEC TID 5290 Book 1, pp. 162–167, 1958, that uranium metal in the following cell at 990° K. produced an open circuit potential of 2 volts, U-UCl*$_3$/NaCl-KCl/AgCl-Ag   E=2.00 volts and the open circuit potential of U-U(III) in LiCl-KCl at 450° C. has been investigated, no attempt has been made to use either uranium metal or the oxides such as $UO_2$, $UO_3$, or ($UO_4 \cdot 2H_2O$) in power producing cells.

In the present invention these oxides of uranium, $UO_2$, $UO_3$ and ($UO_4 \cdot 2H_2O$) having valence states of 4, 6 and 6 respectively have been used for cathodes in cells using uranium metal, magnesium or 10% by weight lithium-lead alloy anodes. High purity (98%+) uranium metal in sheet form was used as the uranium anode in examples disclosed herein. It has been found that $UO_3$ used in the following cell at 450° C. gave the indicated performance.

Mg/LiCl-KCl-Kaolin/LiCl-KCl-$UO_3$/Ni
Average open circuit voltage—1.85 v.
Closed circuit voltage—1.10 v.
Current density ma./cm.$^2$—125
Life to 80% of 10 second CCV—250 seconds The $UO_3$-LiPb electrode system will give potentials about 0.50 higher than this at comparable current densities. When uranium metal anodes are used with $UO_3$ cathodes in the following cell 1.0 volt at a current density of 100 ma./cm.$^2$ was obtained.

U/LiCl-KCl-Kaolin/LiCl-KCl-$UO_3$/Ni

This electrochemical system is an entirely new combination while Mg and Li-Pb anodes were previously in use.

There is no evidence that $UO_3$ reacts with the electrolytes in which it is used. This is a decided advantage over the $V_2O_5$ cathodes whose efficiency is drastically reduced by such side reactions. For example, $V_2O_5$ has a theoretical electrochemical capacity of 1081 ampere-seconds/gram while that of $UO_3$ is 640 ampere-seconds/gram. However, the side reactions and polarization phenomena associated with the use of $V_2O_5$ cathodes have allowed only about 10% utilization of its theoretical capacity. With optimization of the conditions it is believed that $UO_3$ can be more efficiently used than is $V_2O_5$, thus increasing the capacity of thermal cells incorporating it.

Uranium peroxide, dihydrate ($UO_4 \cdot 2H_2O$) may be used as a cathode material but its most efficient utilization is at temperatures below 200° C., since it is slowly decomposed to $UO_3$ above that temperature. However, the resulting $UO_3$ is an efficient cathode material as discussed herein.

The foregoing described cells were constructed in the following manner: Electrolyte "pills" are made in two sections, an anolyte and a catholyte. The anolyte section consists of 65% electrolyte (LiCl-KCl eutectic or other electrolyte) and 35% dry 325 mesh kaolin. These materials are intimately mixed in a dry atmosphere then pressed into pills 1 cm. diameter x .15 cm. thick at 50,000 p.s.i. in a steel die. The catholyte is composed of 65% oxide, as the active cathode material, and 35% electrolyte prepared and pressed into pills as with the anolyte. It is also possible to prepare a composite anolyte-catholyte pill by layering the various components during pressing operations. In the cell assembly, shown in the figure of drawing, the anolyte 10 and the catholyte 12 are appropriately placed between the anode 14 and a cathode collector (cathector) 16 of nickel for example. To increase the output of these cells a uranium oxide glass coating 18 may be used on the cathode collector 16 as shown in the figure. Glass coating 18 may be a combination of a uranium oxide and other oxide of boron,

* Saturated solution of UCl$_3$ in NaCl-KCl.

icon, etc. (e.g. $UO_3$—90 wt. percent, $B_2O_3$—10 wt. percent; $UO_3$—90 wt. percent, $P_2O_5$—10 wt. percent; or $UO_3$—45 wt. percent, $V_2O_5$—45 wt. percent, $B_2O_3$—10 wt. percent) which will increase the output of the cell through better conductivity or connection to the cathode collector 16. Such use of a glass, but involving vanadium oxides, is the subject of a copending patent application Serial No. 91,551 filed February 24, 1961 by William C. Spindler entitled Galvanic Cell Electrode now U.S. Patent No. 3,160,531. However, the use of uranium oxides is unique with the present invention.

The results of using uranium metal and $UO_3$ in thermal cells is shown in the following table:

The output and coulombic efficiency columns above were computed by calculations as shown, by way of example, for catholyte pill No. 6 as follows:

Weight of $UO_3$ contained in pill No. 6, where wt. of pill is 0.13 gr. = 0.13 gm. × 65% $UO_3$ = .085 gr. $UO_3$.
Based on 2 electron charge $UO_3 \rightarrow UO_2 + \frac{1}{2}O_2 + 2e^-$ gives 2 Faradays or 2 × 96450 Coulombs = 192900 Coulombs.
1-Molecular weight $UO_3$ (286 gr.) gives 192900 Coulombs.

$$\frac{.085}{286} \times 192900 = 57.0 \text{ coulombs (theoretically) from .085 gr. } UO_3.$$

| Cell No. | An. | Electrolyte | | | | Cath. | Temp. | POV | MOV | PCV | CD | ARO | CRO | ARC | CRC | Life |
|---|---|---|---|---|---|---|---|---|---|---|---|---|---|---|---|---|
| 5 | U | LK | KA1 | | | NI | 450 | 132 | 135 | 36 | 27 | 181 | 48 | | | 488 |
| 6 | U | LK | KA1 | | | NI | 450 | 132 | 135 | 35 | 30 | 173 | 45 | 166 | 135 | |
| 7 | U | LK | KA1 | LK | U65 | NI | 450 | 141 | 141 | 35 | 30 | 147 | 30 | 143 | 115 | |
| 8 | U | LK | KA1 | LK | U65 | PT | 450 | 205 | 179 | 61 | 48 | 175 | 4 | 103 | 5 | 248 |
| 9 | U | LK | KA1 | LK | U65 | NI | 450 | 143 | 143 | 120 | 24 | 143 | 35 | | | 1,648 |
| 0 | U | LK | KA1 | LK | U65 | NI | 450 | 171 | 181 | 115 | 105 | 215 | 26 | | | 1,508 |
| 2 | MG | LK | KA1 | LK | U65 | NI | 450 | 137 | 146 | 90 | 75 | 175 | 35 | 173 | 105 | 508 |
| 3 | MG | LK | KA1 | LK | U65 | NI | 450 | 187 | 193 | 75 | 66 | 183 | 17 | 60 | 60 | 1,808 |
| 4 | MG | LK | KA1 | LK | U65 | PT | 450 | 215 | 253 | 155 | 135 | | | | | 758 |
| 5 | LP | LK | KA1 | LK | U65 | NI | 450 | 137 | 138 | 87 | 80 | | | | | 958 |
| 6 | LP | LK | KA1 | LL | U65 | NI | 350 | 201 | 178 | | | 154 | 45 | | | |
| 7 | LP | LL | KA1 | LK | U65 | NI | 450 | 183 | 182 | 153 | 38 | 255 | 71 | 177 | 21 | 4,558 |
| 3 | MG | LK | KA1 | LK | U65 | NI | 450 | 179 | 181 | 146 | 65 | | | | | 6,008 |
| 4 | MG | LK | KA1 | LK | U65 | NI | 450 | 183 | 183 | | | | | | | |
| 5 | MG | LK | KA1 | LK | U65 | NI | 450 | 177 | 180 | 139 | 67 | | | | | 4,858 |
| 6 | MG | LK | KA1 | LK | U65 | NI | 450 | 193 | 181 | 154 | 69 | | | | | 5,458 |
| 7 | MG | LK | KA1 | LK | U65 | NI | 450 | 207 | 180 | 163 | 69 | | | | | 4,258 |
| 8 | MG | LK | KA1 | LK | U65 | NI | 450 | 217 | 181 | 157 | 69 | | | | | 4,408 |
| 9 | MG | LK | KA1 | LK | U65 | NI | 450 | 180 | 181 | 151 | 69 | | | | | 5,258 |

*Description of column headings for above table*

An.: Anode, chemical symbol used, (LP is $Li_4Pb$ alloy)
Electrolyte:
  LK = LiCl-KCl eutectic
  LL = LiOH-LiCl eutectic
  KA1 = kaolin, Edgar Plastic, Florida
  U65 = 65% $UO_3$, balance is electrolyte
Cath.: Cathode collector, chemical symbol used
Temp.: Degrees C
POV: Peak open circuit voltage (all voltages are ×100)
MOV: Mean open circuit voltage
PCV: Peak closed circuit voltage
CD: Current density, ma./cm.$^2$
ARO: Anode-reference voltage when anode-cathode are on open circuit.
CRO: Cathode-reference voltage when anode-cathode are on open circuit.
ARC: Anode-reference voltage when anode-cathode are on closed circuit.
CRC: Cathode-reference voltage when anode-cathode are on closed circuit.
Life: Life in seconds to 80% of PCV (the 8 designates 80%).

The coulombic efficiency of $UO_3$-Mg cells has been determined by maintaining a material balance on weighed $UO_3$ catholyte pills. Cell tests have been conducted under conditions such that the power output could be calculated. The data obtained is presented in the following table:

Coulombs actually obtained = .069 amps for 525 seconds = 36.2 amp-secs (Coulombs).

$$\frac{36.2}{.085} = 426 \text{ amp-secs/gr.}$$

$$\frac{36.2}{57.0} \times 100 = 63.5\% \text{ efficiency.}$$

These calculations are based entirely on the weight of $UO_3$ and the recorded current (C.D.); the area and volume of the pills do not enter into the efficiency calculations.

The cell lives and efficiencies may be considerably improved because in practically all of these tests some $UO_3$ was squeezed out of the reaction zone.

The use of $UO_3$ in thermal cells is technically feasible because it does not react with electrolyte; it gives a reasonably high potential (which may be improved in optimum conditions); its coulombic capacity is high; it is readily available due to surplus stocks of depleted uranium oxides after removal of fissionable uranium; and $UO_3$ can be prepared uniformly with no uncontrollable variations due to source of supply.

On a watt-hours-per-pound basis, the Mg-$UO_3$ system is very attractive at an operating level of —1.5 volts. It is instructive to compare the cell reactions for $V_2O_5$ and $UO_3$ from the standpoint of coulombic efficiency.

For $V_2O_5$ theoretically the cell reaction is $$V_2O_5 + Mg \rightarrow MgO + V_2O_4 \qquad (1)$$

| Catholyte pill No. | $UO_3$, weight (grams) | CD | | Life (secs.) to 80% CCV | Output, amp.-secs./gr. | Cathode coul. eff., percent |
|---|---|---|---|---|---|---|
| | | CCV | ma./cm.$^2$ | | | |
| 1 | .071 | 1.53 | 38 | 455+ | (¹) | (¹) |
| 2 | .091 | 1.57 | 69 | 440 | 341 | 50.3 |
| 3 | .098 | 1.46 | 65 | 600 | 400 | 59.2 |
| 4 | .110 | 1.54 | 69 | 545 | 341 | 50.4 |
| 5 | .091 | 1.63 | 69 | 425 | 322 | 47.8 |
| 6 | .085 | 1.51 | 69 | 525 | 428 | 63.5 |
| 7 | .085 | 1.39 | 67 | 485 | 379 | 56.2 |

¹ Not calculated.

This reaction should give 118 amp-hrs./lb., and −2.5 volts would produce 295 watt-hrs./lb. However, $V_2O_5$ undergoes side reactions with the electrolyte. For example:

$$2V_2O_5 + 3LiCl \rightarrow VOCl_3 + 3LiVO_3 \qquad (2)$$

$$2LiCl + V_2O_5 \rightarrow V_2O_4 + Cl_2 + Li_2V_2O_5 \qquad (3)$$

(no electrons released to outside circuit from these reactions). These reactions reduce the coulombic output of the attained efficiency of 10%, (11.8 amp-hr., 29.5 watt-hrs./lb. are available. That is, on the basis of Equation 1, the greatest efficiency to be expected is 22.9%. However, the attained efficiency of 10% (11.8 amp-hr., 29.5 watt-hr./lb.), emphasized how drastically do side reactions and cell polarization reduce the output of $V_2O_5$ cathodes.

For $UO_3$-Mg cells only the following reaction occurs:

$$UO_3 + Mg \rightarrow MgO + UO_2 \qquad (4)$$

This reaction should give 74 amp-hr./lb. or 111 watt-hrs./lb. at −1.50 volts. At the determined average efficiency of 54.5% these values reduce to 40 amp-hr. and 60 watt-hr. per lb. The advantages of $UO_3$ compared to $V_2O_5$ in thermal battery usage are shown by these figures.

The use of uranium metal anodes is unique with the present invention since all other thermal cells have used the light Group I and II metals as anodes. Uranium oxide cathodes may be useful in cells with other fused systems.

Obviously many modifications and variations of the present invention are possible in the light of the above teachings. It is therefore to be understood that within the scope of the appended claims the invention may be practiced otherwise than as specifically described.

What is claimed is:

1. An electrochemical power producing battery cell comprising:
   (a) a solid uranium metal anode,
   (b) a cathode of uranium oxide ($UO_3$),
   (c) an electrolyte pill made in two sections—an anolyte section and a catholyte section,
   (d) said cell being operative at and above the melting point of said electrolyte and below the melting point of the cell electrodes.

2. An electrochemical power producing battery cell comprising:
   (a) a solid uranium metal anode,
   (b) a cathode consisting of $UO_3$ combined with glass promoting material selected from the group consisting of $B_2O_3$, $P_2O_5$ and $SiO_2$ in an amount depending upon the glass promoting material to form the uranium oxide ($UO_3$) material into its glassy state,
   (c) an electrolyte pill made in two sections—an anolyte section and a catholyte section,
      (1) said anolyte section consisting of a mixture of 65% of a fused salt electrolyte selected from the group consisting of LiCl-KCl and LiOH-LiCl, and 35% absorbent kaolin, and pressed into desired shape,
      (2) said catholyte section consisting of a mixture of 65% uranium oxide and 35% of a fused salt selected from the group consisting of LiCl-KCl and LiOH-LiCl, and pressed into desired shape,
   (d) said cell being operative at and above the melting point of said electrolyte and below the melting point of the cell electrodes.

References Cited by the Examiner
UNITED STATES PATENTS

| | | | |
|---|---|---|---|
| 2,631,180 | 3/53 | Robinson | 136—153 |
| 2,670,395 | 2/54 | Audubert et al. | 136—136 |
| 2,739,111 | 3/56 | Noland et al. | 204—1.5 |
| 2,942,050 | 6/60 | Denes | 136—136 |
| 3,122,509 | 2/64 | Handwerk et al. | 252—201.1 |

OTHER REFERENCES

Goodrich et al.: Journal of the Electrochemical Society, volume 99, pages 207C–208C, August 1952.

Levin et al.: Phase Diagrams For Ceramists, 1956, page 217.

Mellor: Comprehensive Treatise on Inorganic and Theoretical Chemistry, vol. 12, 1932, pages 26, 27, 101.

WINSTON A. DOUGLAS, *Primary Examiner.*

JOHN R. SPECK, MURRAY TILLMAN, JOHN H. MACK, *Examiners.*